Nov. 19, 1935.  J. R. GAMMETER  2,021,299
METHOD AND APPARATUS FOR MAKING DIPPED RUBBER ARTICLES
Original Filed Jan. 20, 1930    14 Sheets-Sheet 10
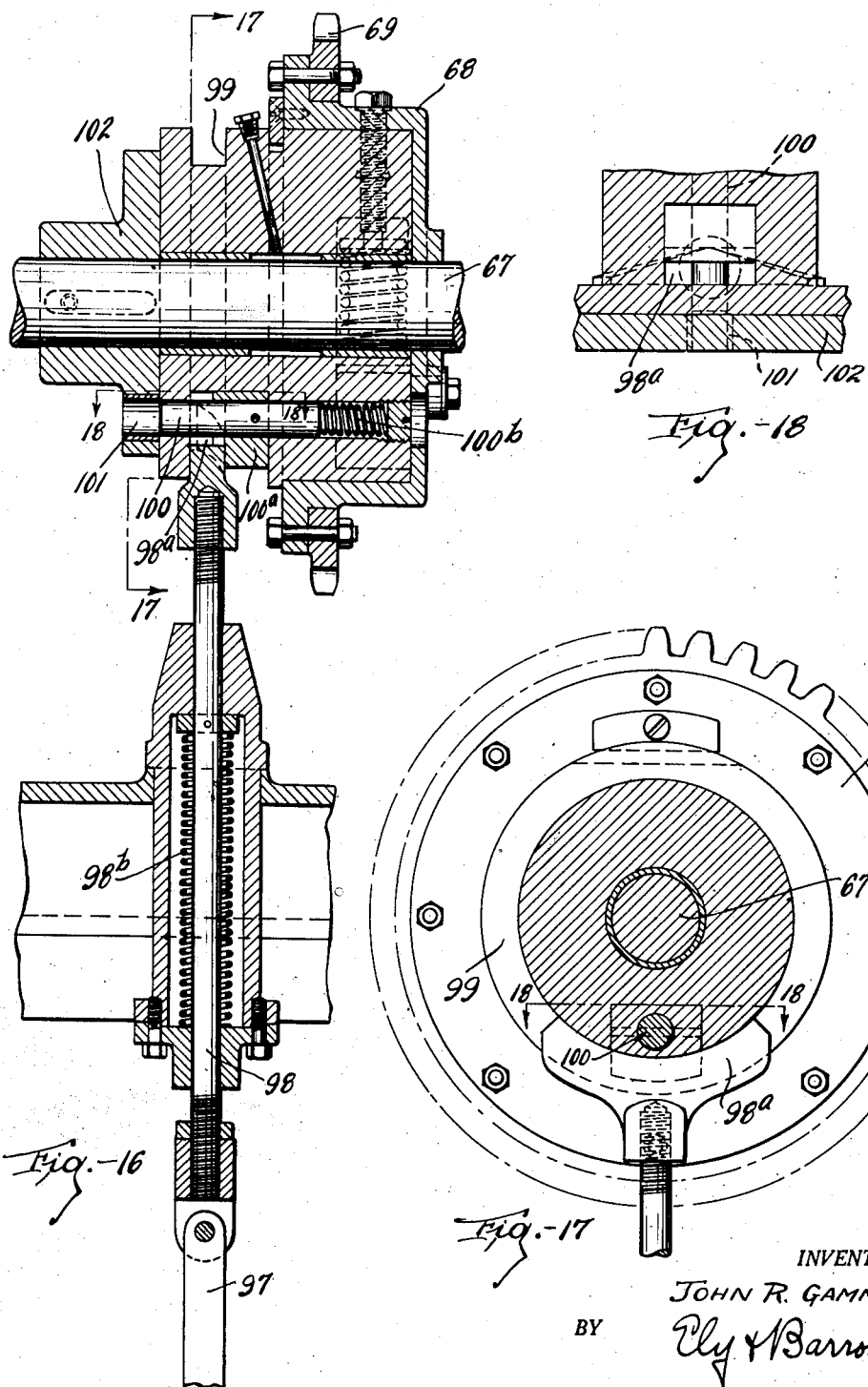
INVENTOR.
JOHN R. GAMMETER
BY Ely & Barrow
ATTORNEYS Nov. 19, 1935.    J. R. GAMMETER    2,021,299
METHOD AND APPARATUS FOR MAKING DIPPED RUBBER ARTICLES
Original Filed Jan. 20, 1930    14 Sheets-Sheet 12
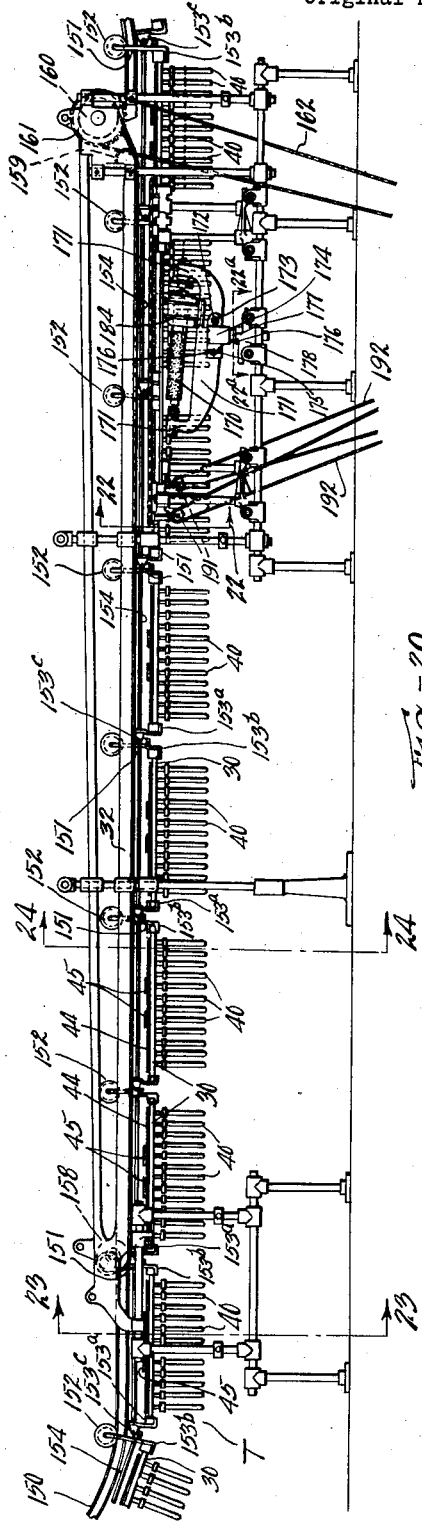
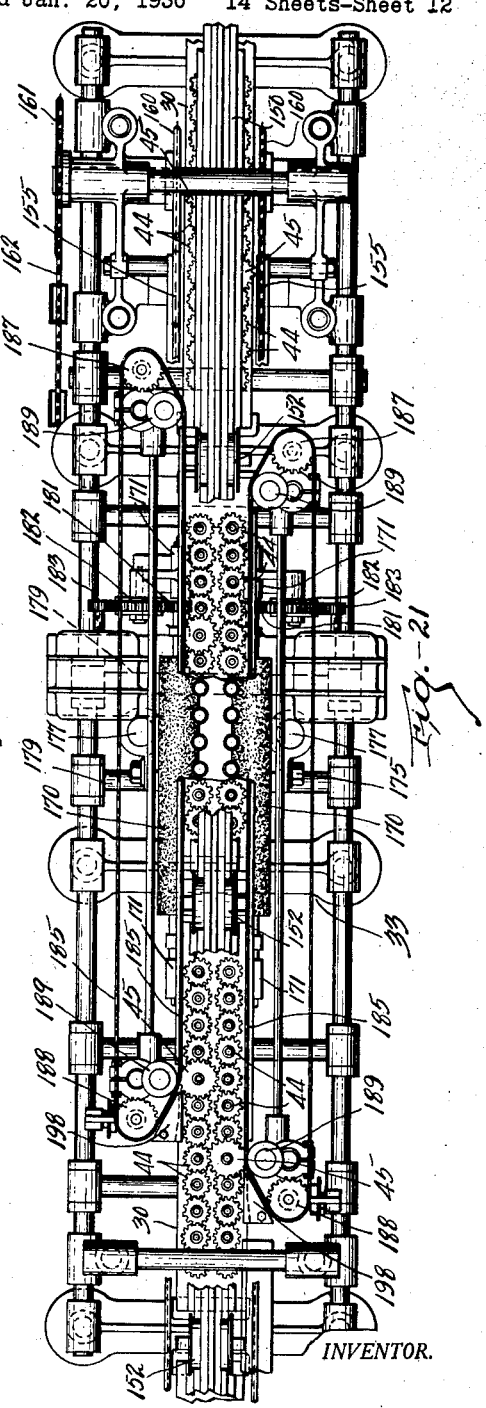
INVENTOR.
BY    JOHN R. GAMMETER
BY    Ely & Barrow
ATTORNEYS

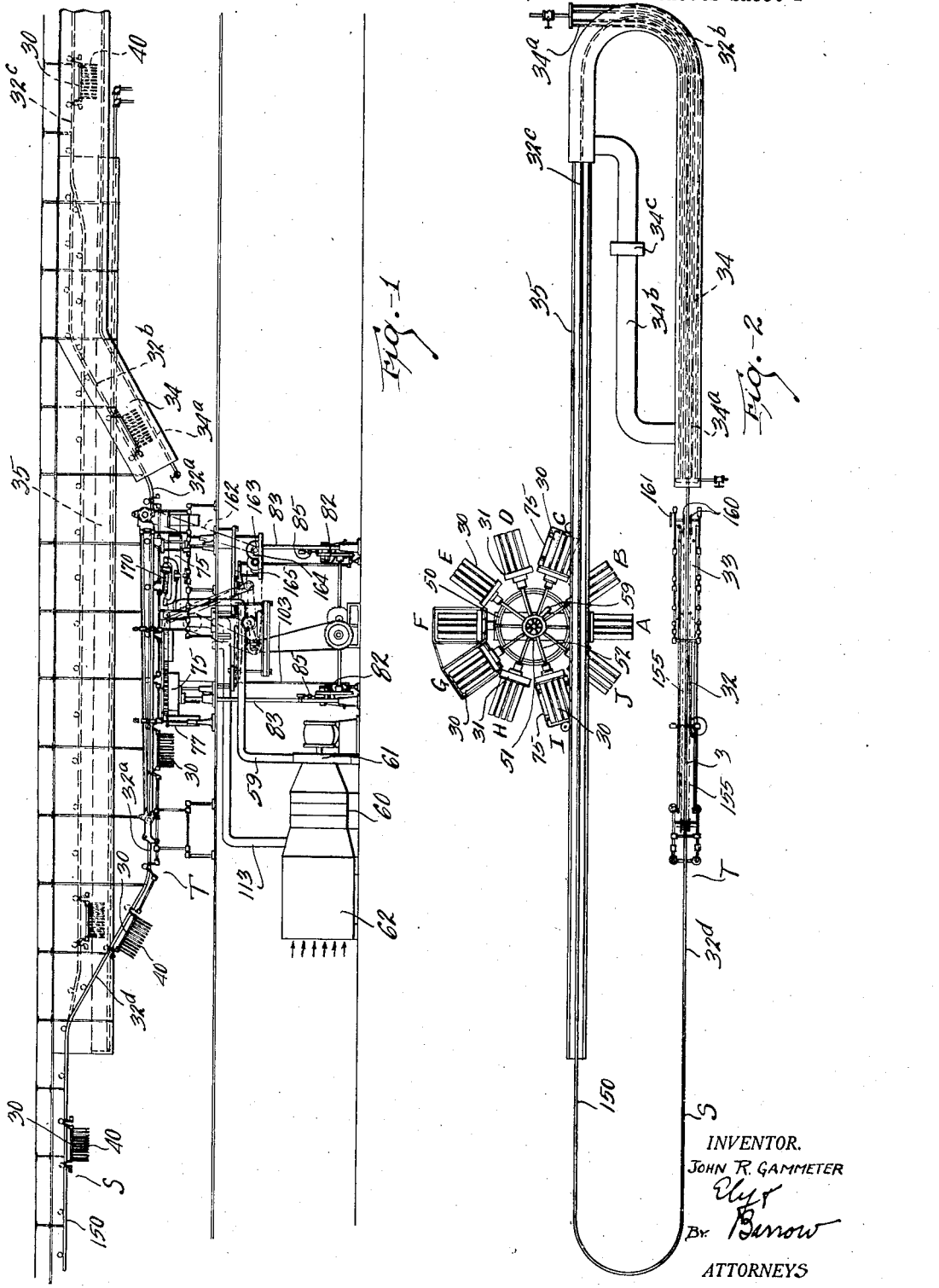

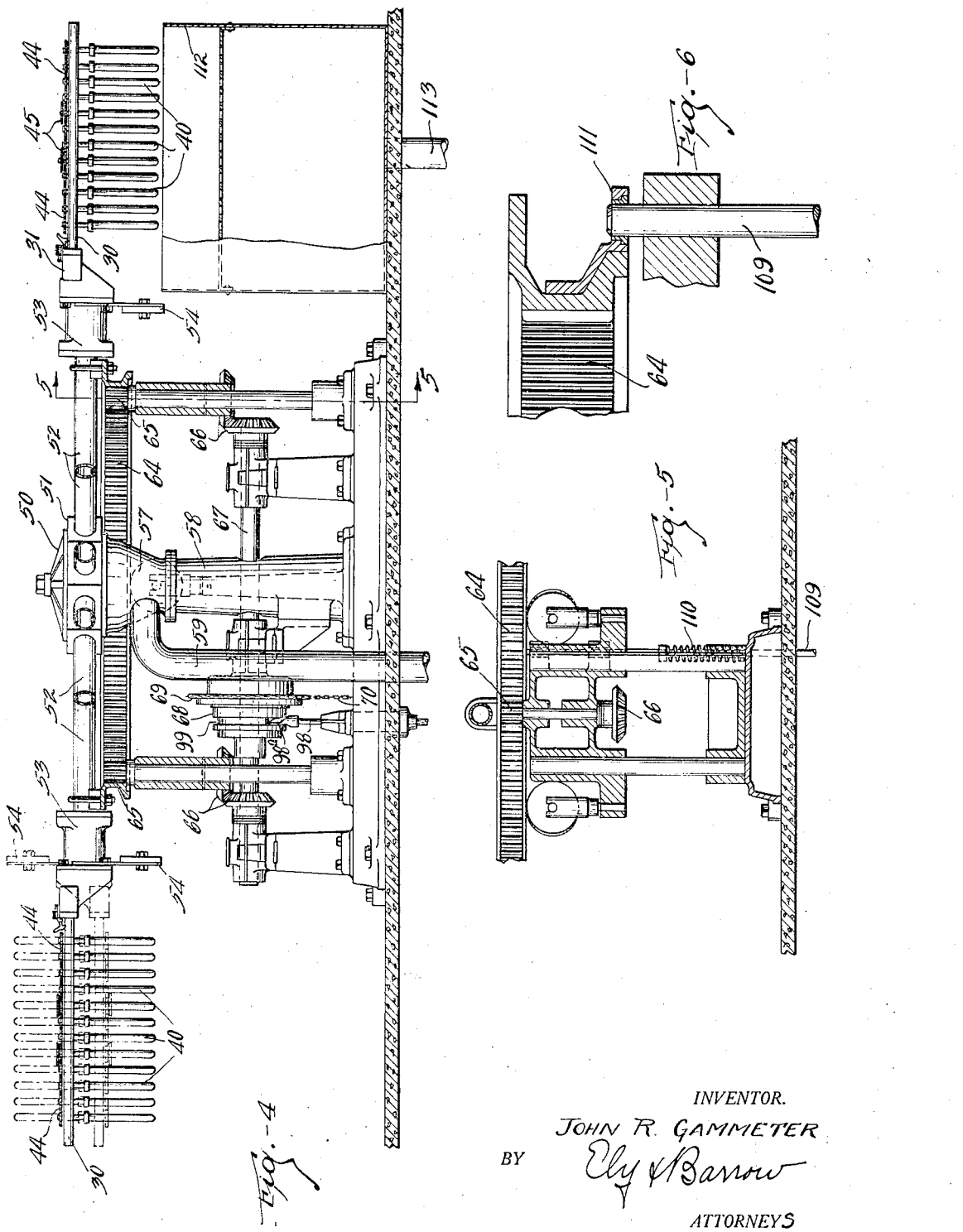

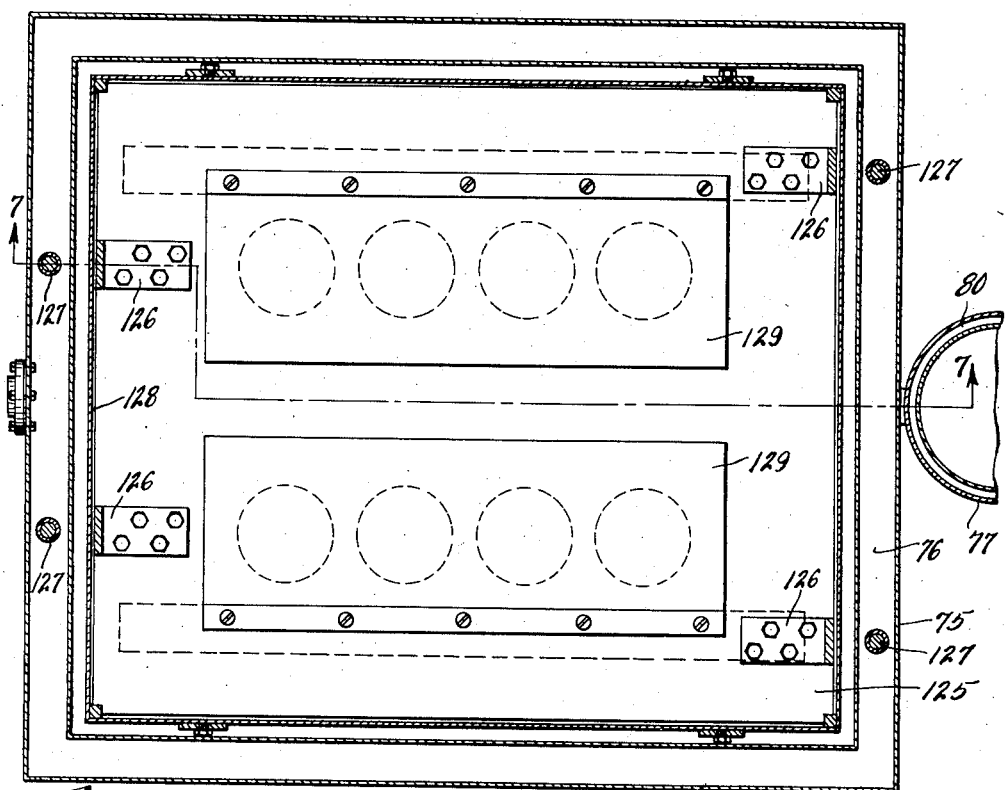
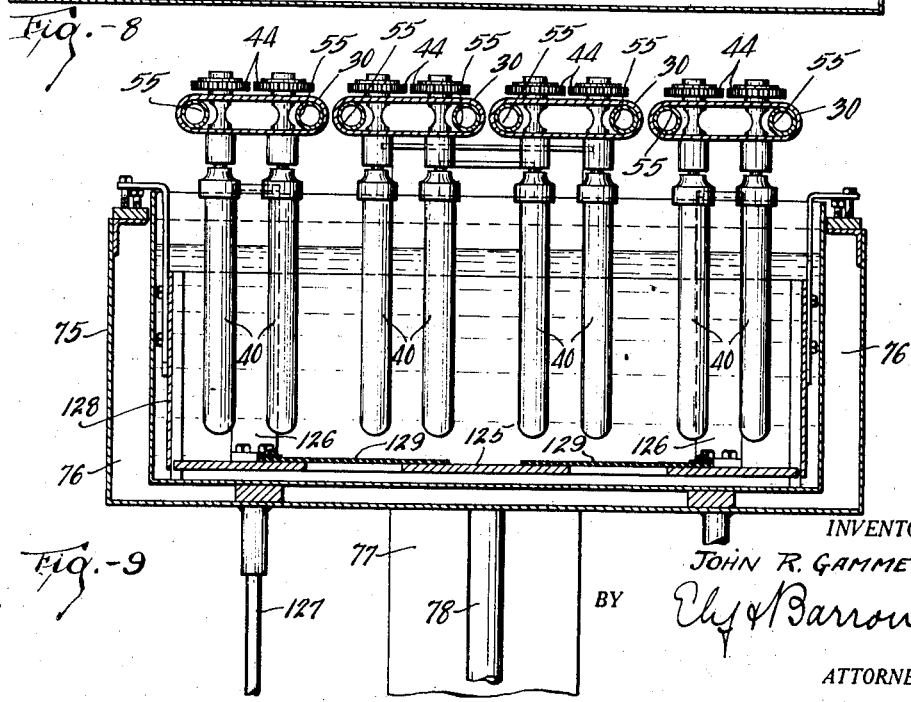

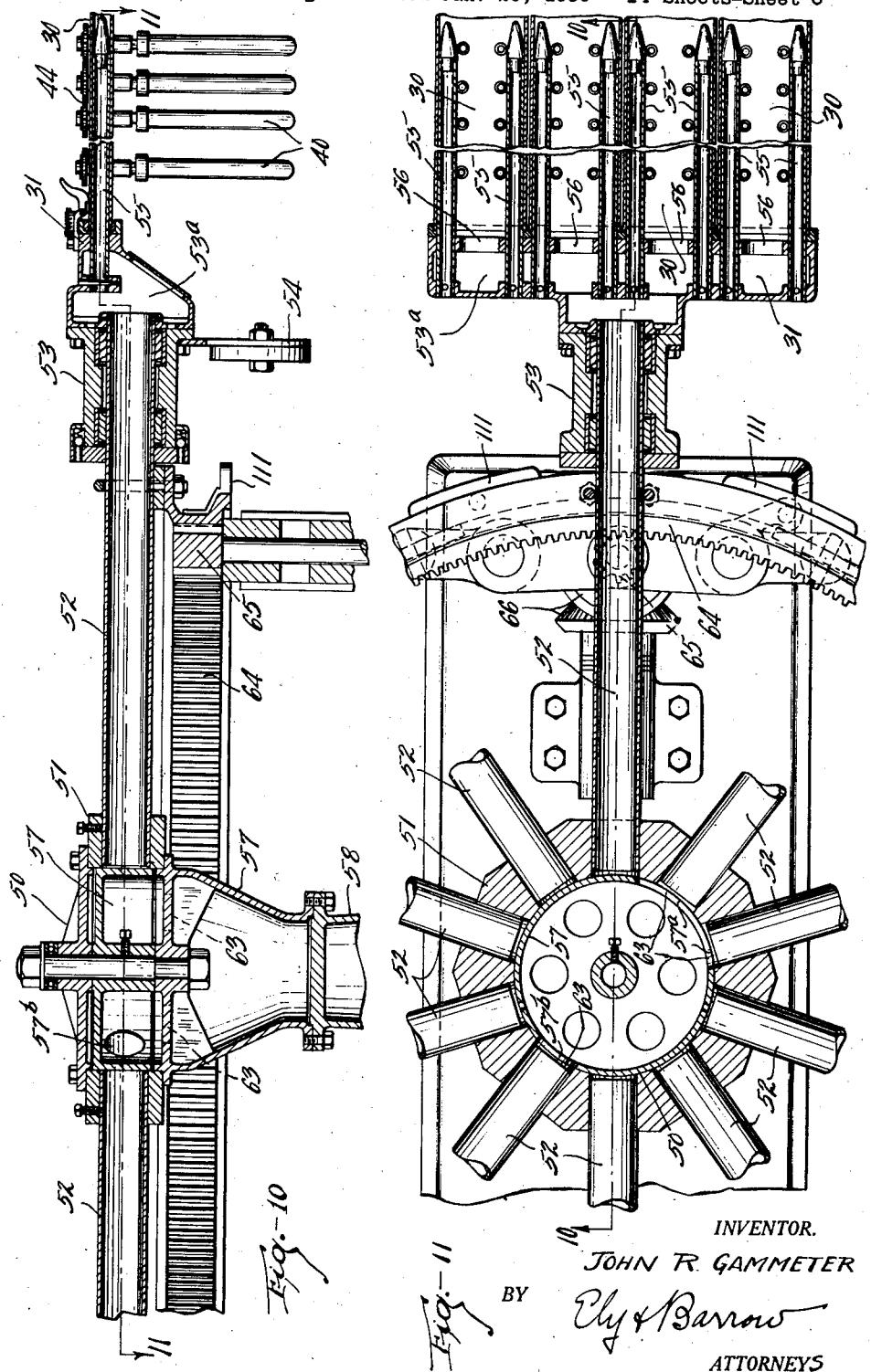

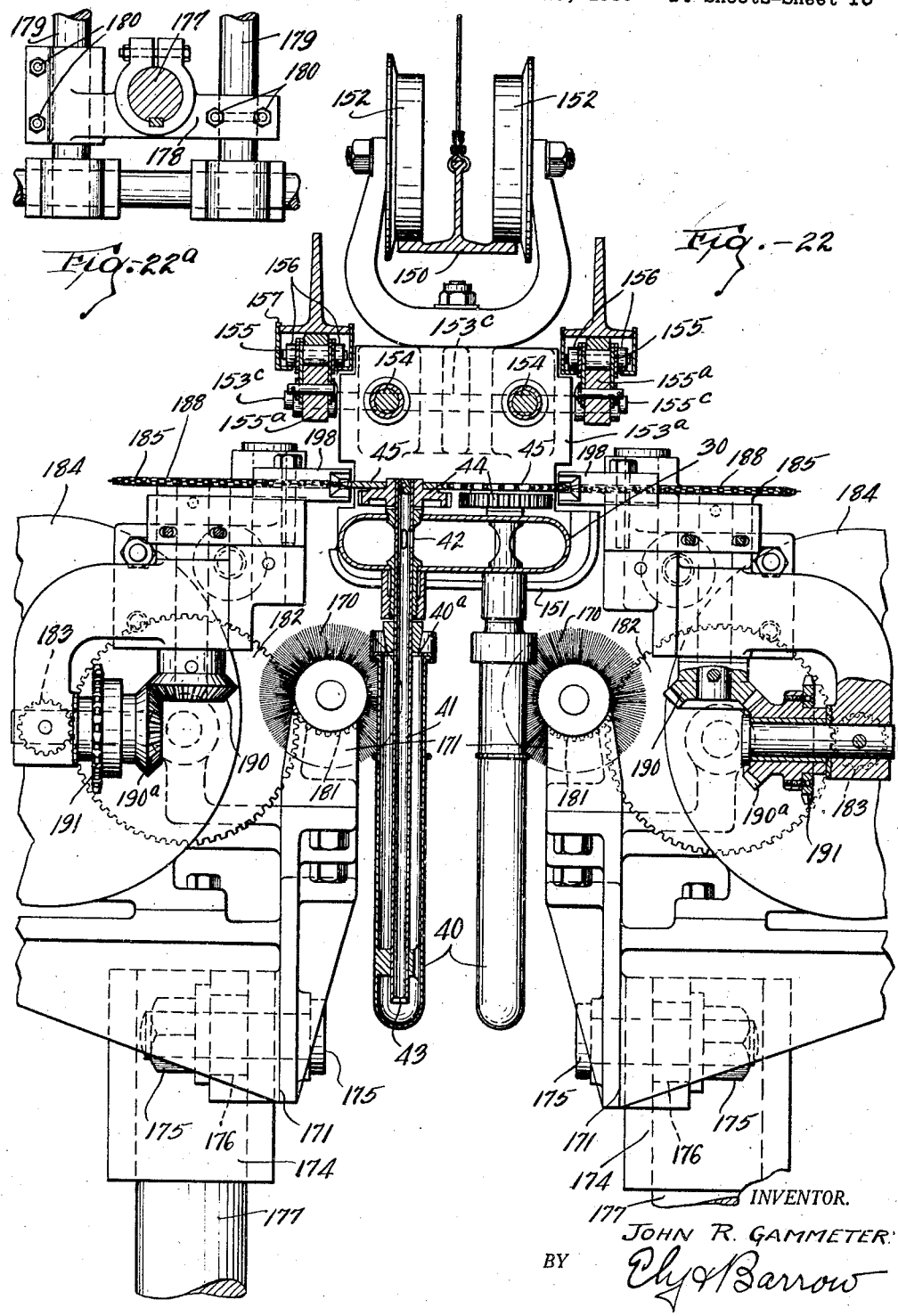

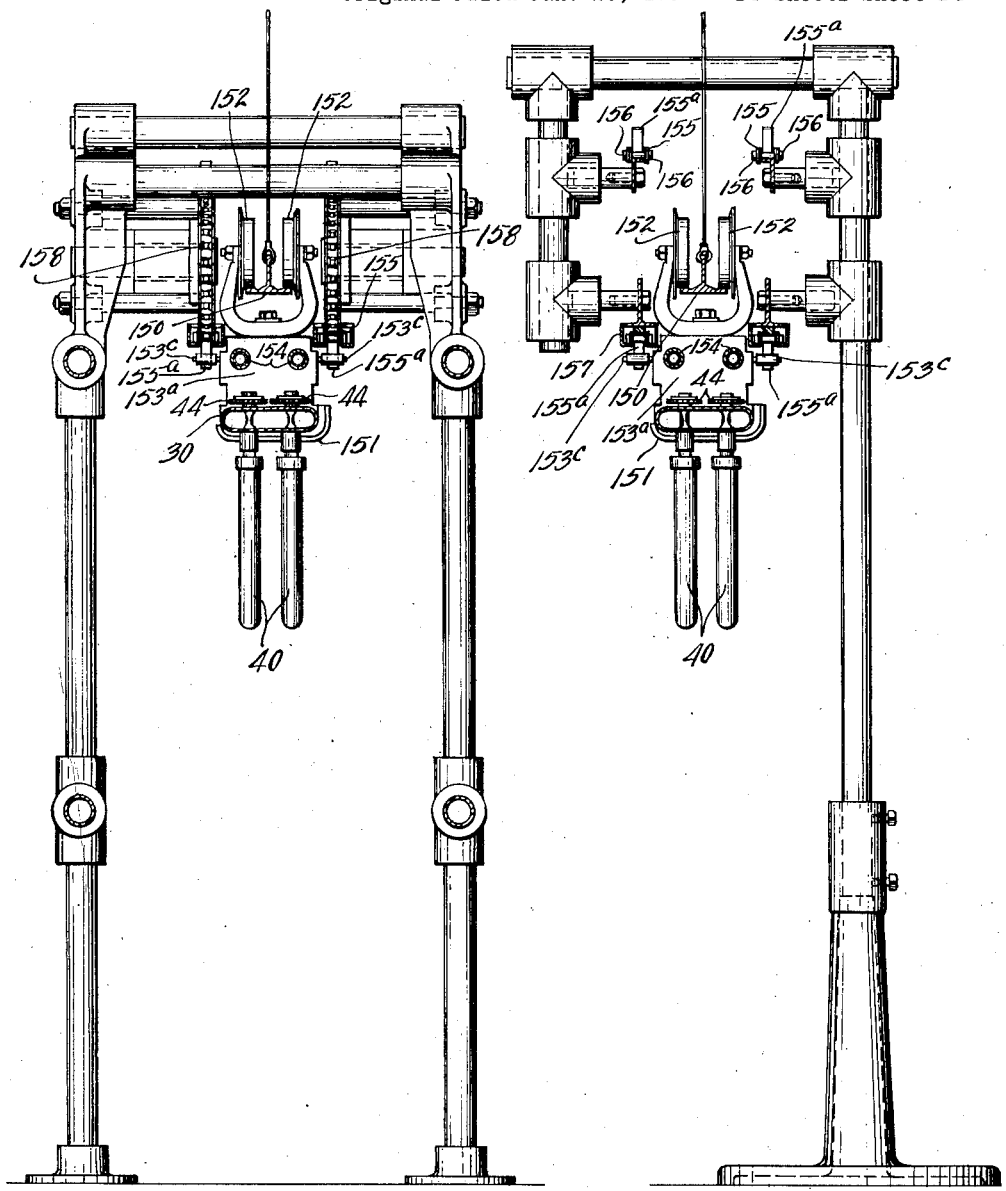

Patented Nov. 19, 1935

2,021,299

UNITED STATES PATENT OFFICE 2,021,299

METHOD AND APPARATUS FOR MAKING DIPPED RUBBER ARTICLES

John R. Gammeter, Akron, Ohio

Application January 20, 1930, Serial No. 422,016
Renewed August 7, 1934

26 Claims. (Cl. 18—24)

This invention relates to methods and apparatus for making dipped rubber articles.

The general purpose of the invention is to devise a method and apparatus for the effective production of dipped rubber articles from latex or water dispersions of rubber.

Heretofore, the only commercially practical procedure for making dipped rubber goods has been to provide a solution of crude rubber in a solvent such as naptha and to dip forms one or more times in this solution, drying the films of rubber on the forms between and after dippings, rolling rings or beads on the mouths of the dipped articles, placing the forms in a vulcanizer to which gaseous or vaporous vulcanizing reagents are supplied in the presence of heat, stripping the articles from the forms subsequent to vulcanization and cleaning the forms in preparation for reuse.

Such dipping plants use crates or bales of crude rubber and drums of naptha, the rubber being milled along with compounding ingredients, and dissolved into the gasoline to make a rubber cement in which the forms are dipped.

Large vats of the cement are required and racks are arranged over these vats for holding the forms on boards or carriers in an inverted relation and for lowering and raising the forms to perform the dipping operations. Between dippings the forms are allowed to drain and afterward are inverted to distribute the rubber as uniformly as possible over the surfaces of the form.

The forms on the boards or carriers are then removed from the racks and trucked to a drying room in which they are dried in a heated atmosphere about the forms. The forms on the boards are then trucked to the bead rolling machines and fed through these machines to form the beads. The forms issuing from the bead rolling machine are next trucked to a vulcanizer in which they are subjected to fumes of curing or vulcanizing reagents.

After vulcanization, the forms are trucked to a stripping machine in which the dipped rubber goods are stripped from the forms, the forms then being passed through a cleaning machine and finally the forms are trucked back to the dipping racks and placed thereon for redipping.

This method involves the use of the inflammable solvent naptha with an ever-present fire hazard necessitating high insurance rates and it involves also the labor and expense of milling and dissolving the crude rubber, and the large amount of trucking and handling of forms, the latter requiring heavy replacement of broken forms which are made of glass.

The chief objects of the present invention are to provide economical and effective procedure and apparatus for making dipped rubber goods directly from rubber latex or other dispersions of rubber in water. The characteristics of this material, being wholly different from solutions of rubber, has required years of experimentation and development to perfect commercially practical procedure and apparatus for attaining these objects.

Certain features of the invention which were discovered and utilized especially for making dipped goods from latex are, however, of improved utility when used for making articles of this kind from rubber cements and as to these features the invention is not limited to the particular use set forth herein.

Among the more particular objects of the invention are to provide improved dipping procedure and apparatus for making latex goods, to provide improved apparatus for rolling rings upon dipped goods, which apparatus may be advantageously used for cement goods, to provide improved procedure and apparatus for vulcanizing the goods, and to provide an improved procedure and arrangement of apparatus for handling the forms to eliminate a large number of handling operations.

The foregoing and other objects of the invention are attained in the apparatus and by the practice of the method illustrated in the accompanying drawings and described below. It is to be understood that the invention is not limited to the specific form thereof shown and described.

Of the accompanying drawings,

Figure 1 is a side elevation of apparatus embodying and adapted to carry out the invention;

Figure 2 is a plan thereof;

Figure 4 is a section on line 4—4 of Figure 3;

Figure 5 is a section on line 5—5 of Figure 4;

Figure 6 is a section on line 6—6 of Figure 3;

Figure 8 is a section on line 8—8 of Figure 7;

Figure 9 is a section on line 9—9 of Figure 7;

Figure 10 is an enlarged section on lines 10, 10 of Figures 3 and 11;

Figure 11 is a section on line 11—11 of Figure 10;

Figure 16 is a vertical diametral section through the clutch of the dipping turret and a vertical section through the control means for said clutch;

Figure 17 is a section on line 17—17 of Figure 16;

Figure 18 is a section on lines 18—18 in Figures 16 and 17;

Figure 20 is an enlarged side elevation of the stretch of the form conveyor which is associated with the above dipping apparatus and includes the bead rolling apparatus;

Figure 21 is a plan of the bead rolling apparatus;

Figure 22 is an enlarged section on line 22—22 of Figure 20;

Figure 3:
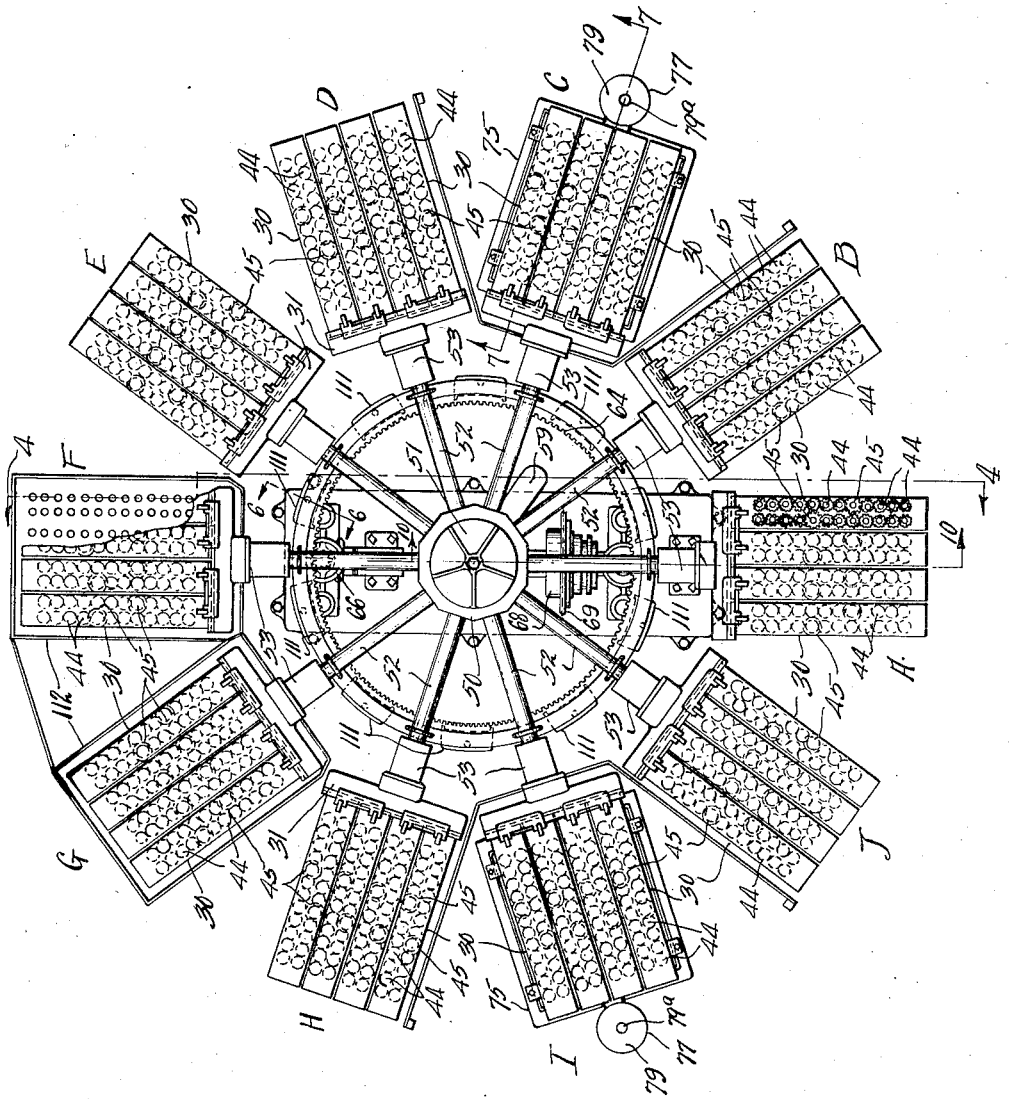
Figure 3 is a plan of the dipping device.

Figure 22ª is an enlarged section on line 22ª—22ª of Figure 20 at one side of the bead roller;

Figure 23 is an enlarged section on line 23—23 of Figure 20; and

Figure 24 is an enlarged section on line 24—24 of Figure 20;

Referring to the drawings, the apparatus embodying the invention includes a number of dipping form racks 30, a dipping and drying device 31 adapted to receive said racks, a conveyor 32 adapted to receive said racks, and a bead roller 33, final drier 34, and vulcanizer 35 associated with said conveyor.

The dipping form racks

The dipping form racks 30 are hollow and may be made from tubular metal such as aluminum. Each rack contains two rows of hollow dipping forms 40, 40 which may be of glass, metal or other suitable material and which preferably have relatively thin walls. The forms are secured on central tubular shafts 41, 41 (see Figure 22) which are journaled in the racks 30, these shafts having one or more inlet openings therein within the hollow rack as indicated at 42 and also one or more outlets 43 within the forms 40 preferably adjacent the tops thereof. On the backs of the racks shafts 41 have gears 44 secured thereon, the gears for each row of forms on each rack being meshed in a train (see Figure 21) and one gear of each chain having a sprocket 45 thereon for driving each chain of gears, said sprocket being off-set on the racks so as not to interfere with each other. One end of each rack 30 is closed or plugged as indicated at 30ª (Figure 7), the other end being left open. Each form 40 has an outlet at 40ª in the bottom thereof (Figure 22). This construction of the form rack permits of circulation of a heated fluid such as hot air through the forms for drying purposes, the air being supplied to the interior of the racks down shafts 41 into the tops of the forms and up through the forms to the outlets 40ª at the bottoms thereof.

The dipping and drying device

The form dipping and drying device may include a rotary turret type of conveyor 50 on which is mounted a spider comprising a hub 51 and tubular arms 52 on the outer ends of which are provided hollow rack supporting heads 53 which may be journaled on the ends of the arms as shown, in which event they are counter-weighted as indicated at 54. These heads are best shown in Figures 10 and 11 and are provided with one or more pairs of outwardly directed bars 55 to receive one or more racks, the pairs of bars being adapted to have the open ends of the racks engaged thereon and slid thereon against the head. Outlets are provided as at 56 to connect the chamber 53ª of the heads 53 with the interior of each rack 30 mounted thereon.

The hub 51 is journaled on a hollow member 57 secured in top of a standard 58 to the interior of which member is connected a duct 59 for delivering hot air from a heater 60 forced into said duct by a fan 61, air being preferably supplied to said heater 60 through a washer 62. Hot air supplied to the member 57 may be distributed through the arms 52 to the racks 30 at desired points about the turret by provision of suitable openings 63, 63 in the member 57 arranged to have arms 52 register therewith when said arms are in said position.

The turret 50 is arranged to intermittently move the form racks between stations about the turret at which various dipping and drying operations are performed. To this end the turret is provided with an internal ring gear 64 with which are meshed pinions 65, 65 adapted to be driven through gearing 66, 66 by a shaft 67, this shaft being arranged to be intermittently connected by a clutch 68 to a driven sprocket 69. Sprocket 69 is driven by a chain 70 in turn driven by a sprocket 71 on a main drive shaft 72. Shaft 72 may be driven through a suitable reduction 73 by a motor 74.

The stations about the turret are indicated in Figure 3 by the letters A, B, C, D, E, F, G, H, I and J respectively. Station A is provided for an operator to remove dipped form racks from the turret and mount empty form racks thereon. Station B is an idle station at which mounting of racks may be finished if necessary. Station C is a dipping station. Stations D and E are drying stations. Stations F and G are form-cooling stations. Station H is an idle station. Station I is another dipping station and station J is a second drying station.

At each of the dipping stations there is provided a dipping tank 75 (see Figures 7, 8 and 9) containing the latex together with vulcanizing reagents and compounding ingredients in suspension therein and a preservative such as ammonia. The walls of this tank are chambered as at 76 for circulation of a refrigerant or cooling medium therein to maintain the latex cool so that the preservative will not evaporate off and to prevent thickening or coagulation of the latex. This tank is arranged to be filled by means of an auxiliary tank 77 mounted on tank 75 and having a connection 78 extending from the bottom thereof to the bottom of tank 75. Tank 77 constitutes a settling tank into which the latex is poured from time to time to maintain the latex in tank 75 at proper level. It is preferably provided with a cap 79 having a small aperture 79ª therein and is preferably provided with a chambered wall 80 connected as indicated at 81 to the chambered wall 76 of the main tank to keep its contents cool. This auxiliary tank is employed to permit air bubbles trapped in the latex to rise to the surface thereof in the auxiliary tank and thus to prevent the presence of bubbles of air in the dipping tank which would cause holes or blisters in the finished dipped goods.

The tanks 75 are arranged to be raised and lowered at the dipping stations to perform the dipping operations, the form racks remaining stationary in inverted relation on the turret during these operations. The raising of the tanks results in dipping of the forms to the required depth in the latex. The lowering of the tanks it has been found must be controlled to produce uniform coatings of latex of fine texture. For these purposes cams 82, 82 are employed to raise and lower the tanks.

Figure 19:
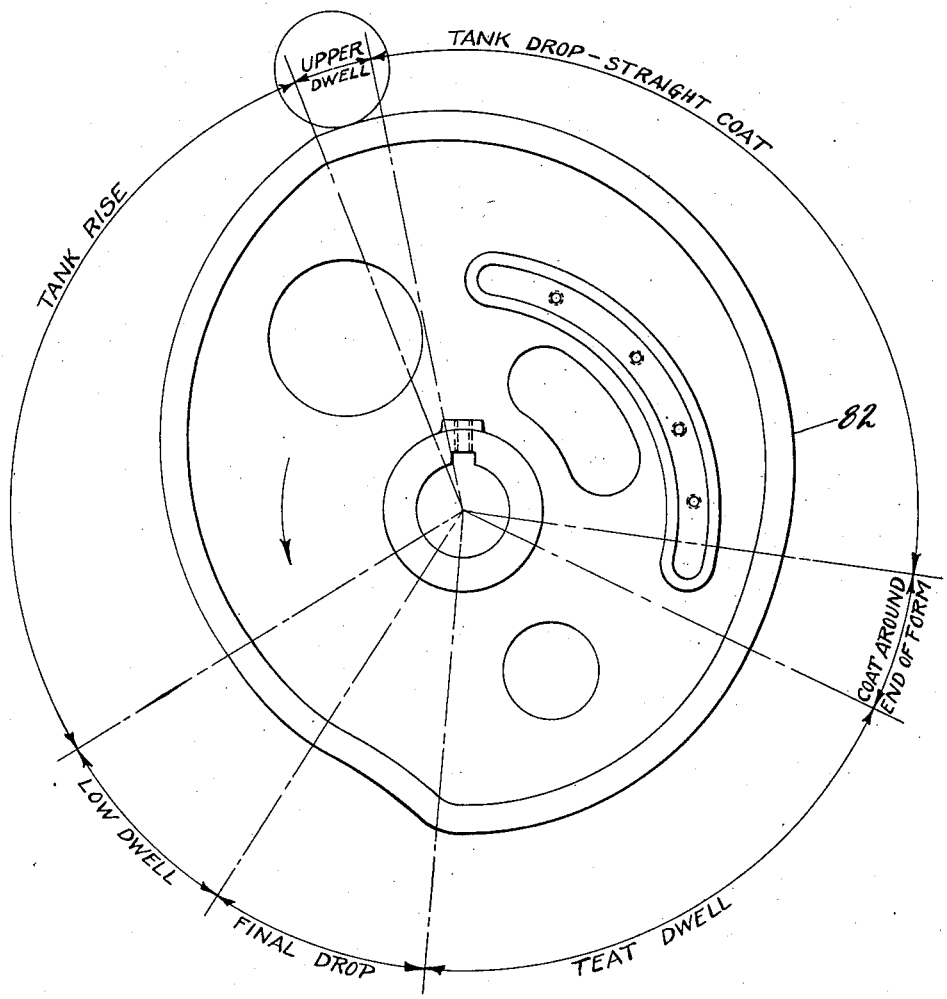
Figure 19 is an elevation of one of the cams controlling the dipping tanks, the portions thereof for performing the various functions being appropriately designated.

The formation of these cams is identical and the various portions thereof are clearly designated in Figure 19. The portions designated "Low dwell" is that portion supporting the tanks in their lowermost positions when the turret is being rotated to move the form racks between the stations. The portion designated "Tank rise" is for elevating the tanks to dip the forms to the proper level. The "Upper dwell" portion maintains the forms dipped to this level for a short period to permit the latex properly to adhere thereto. The portion of the cam designated "Tank drop—Straight coat" is designed to lower the tank at a slow uniform rate to withdraw the forms from the latex sufficiently slowly so that the latex deposited on the forms will take a "set" as it leaves the tank and not flow over the form. This insures an even uniform coat of fine texture over the straight portions of the cot forms shown. In order that this rate of withdrawal shall be maintained over the curved top ends of the forms, the portions "Coat around ends of forms" is provided. This slows up the withdrawal of the form to compensate for the curvature so that the rate of exposure of these coated areas of the form will be substantially the same as along the straight portions of the forms. The portion of the cams marked "Teat dwell" are designed to hold the tank in a position in which the tip ends of the forms are connected to the body of latex by a teat of latex adhering to said tips by capillary contraction to provide time in which the size of this teat may gradually decrease to a minimum under the action of gravity and so that the major portion thereof will snap back into the liquid latex in the tank when the tank is lowered away from the forms. The cam portion marked "Final drop" lowers the tanks out of the way to permit another rotation of the turret.

The tanks 75 are supported on vertically reciprocable rods 83 to which levers 84 are connected by links 85, levers 84 having rollers 86 thereon riding on cams 82 and being pivoted at 87 and provided with counterweights 88.

The cams 82 are also adapted to control rotation of the table to time the rotation thereof during the operation of the "Low dwell" portions of the cams. To this end the cams are provided with cam members 89 thereon for engaging vertically shiftable blocks 90 normally urged upwardly by springs 91 to depress said blocks.

One of these blocks is connected by a link 92 to one end of a lever 93 pivoted at 94 and having its other end hingedly connected by a pin and slot connection to one end of a lever 95 pivoted at 96, the other end of lever 95 being connected by a link 97 to a pin 98 for controlling clutch 68. Pin 98 is normally urged upwardly by a spring 98b into a groove 99 in clutch 68 (see Figures 16 to 18). Clutch 68 is a standard form of knock-out clutch of a known design and it will be sufficient to state herein that a pin 100 in said clutch is normally maintained in a retracted position by a cam member 98a on pin 98 to permit the clutch to idle and when the pin 98 is moved downwardly against spring 98b it disengages cam 98a from the pin 100 allowing the pin to be moved by a spring 100b into an aperture 101 in a member 102 connected to shaft 67. Cam member 98a is designed to retract pin 100 by engagement with block 100a secured to the pin 100 when pin 98 is held up by its spring 98b.

The other shiftable block 90 is connected by a link 103 to one end of a lever 104 pivoted at 105 and hingedly connected at its other end by pin and slot means to one end of a second lever 106. Lever 106 is pivoted at 107 and its other end is connected by a link 108 to a stop pin 109. This pin is normally urged upwardly by a spring 110 (Figures 5 and 6) so as to engage in apertured lugs 111, 111 (see Figure 3) on the turret to lock the turret with the racks arranged at the respective stations.

Latex has a tendency to form a skin over an exposed surface thereof which would be detrimental to effective dipping. In order to prevent this an agitating or rather a surface changing device is associated with each tank to constantly change the latex surface to prevent this "skinning-over" effect. It is essential that this device should have no tendency to whip air into the latex. Accordingly a plate 125 is supported so as to be in the body of the latex in each tank 75 at all times as by means of straps 126 connected to rods 127 vertically reciprocable relative to the tanks (Figures 7, 8 and 9), plates 125 being relatively movable in vertical baffle members 128 enclosing the same at their sides and fixedly supported in the tanks above the bottoms thereof.

Figure 7:
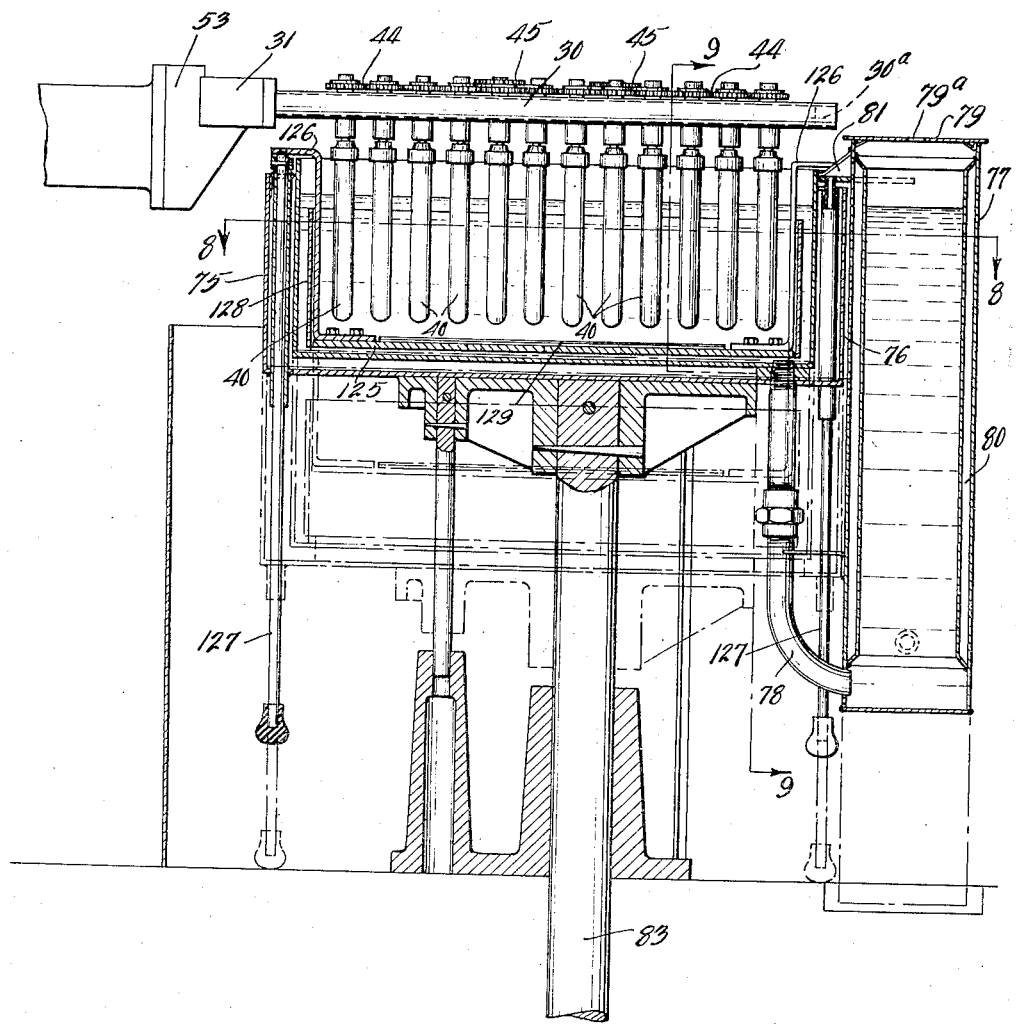
Figure 7 is a section on line 7—7 of Figure 3.
Figure 12:
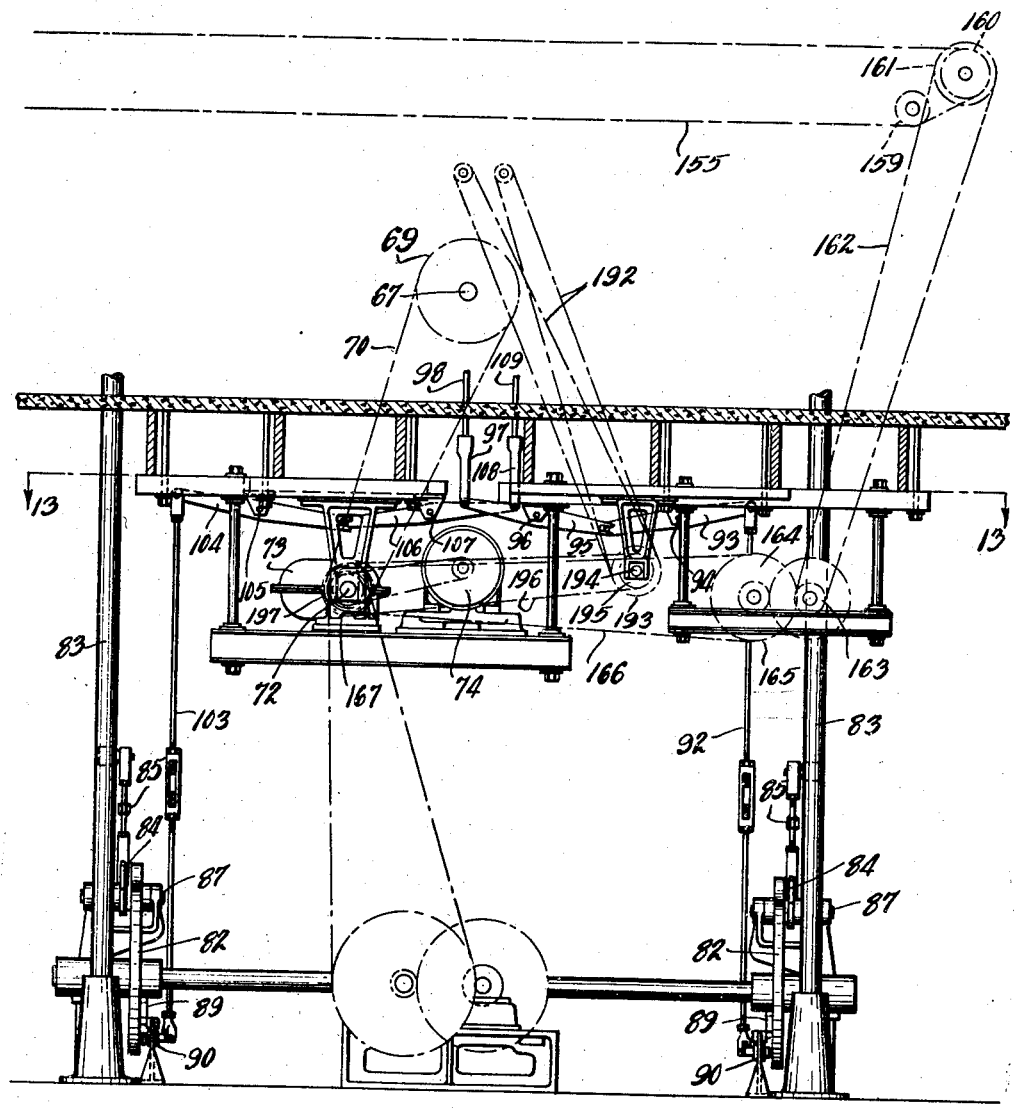
Figure 12 is a more or less diagrammatic view of the power and transmission means for the entire apparatus.
Figure 13:
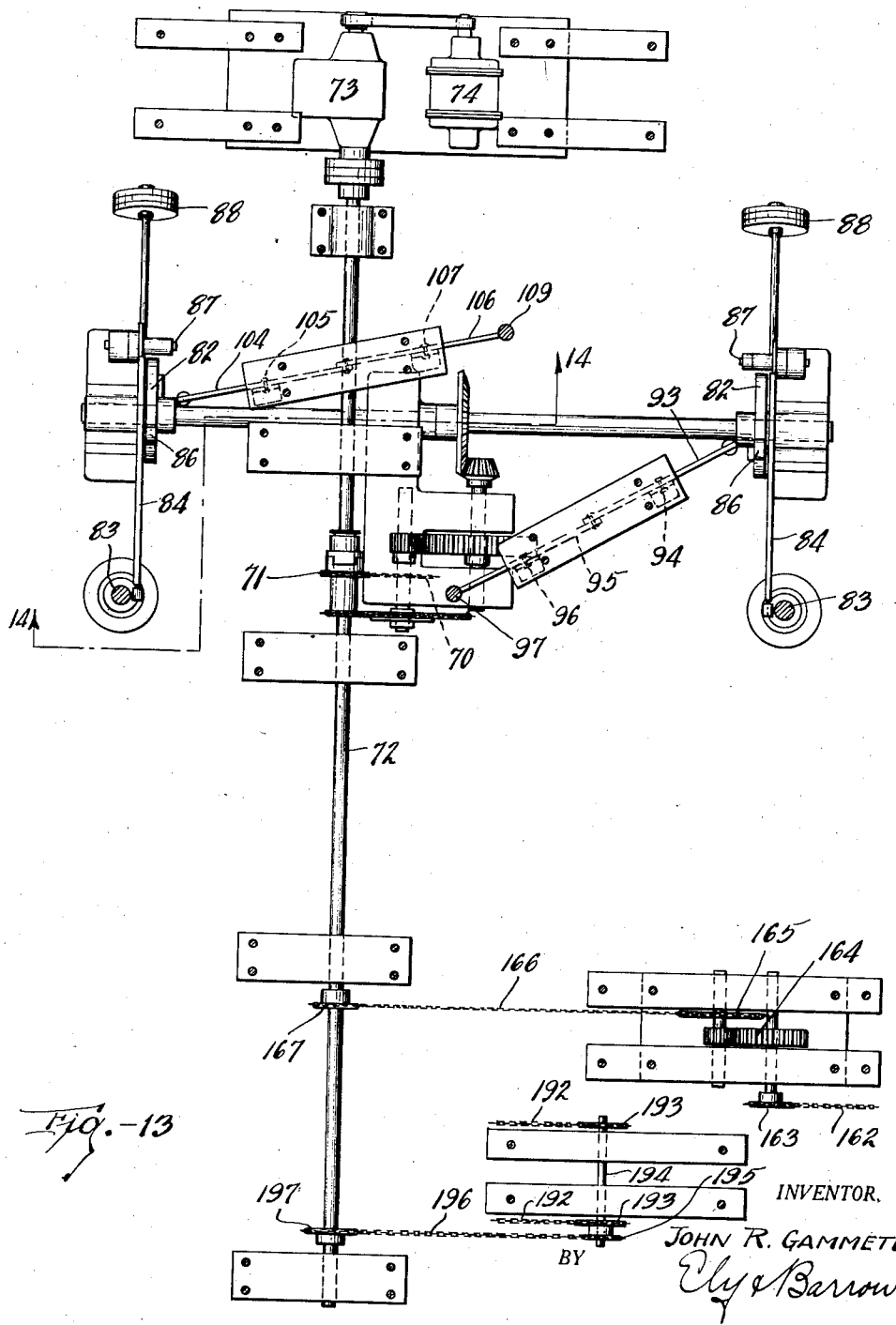
Figure 13 is a sectional plan on line 13—13 of Figure 12.
Figures 14, 15:
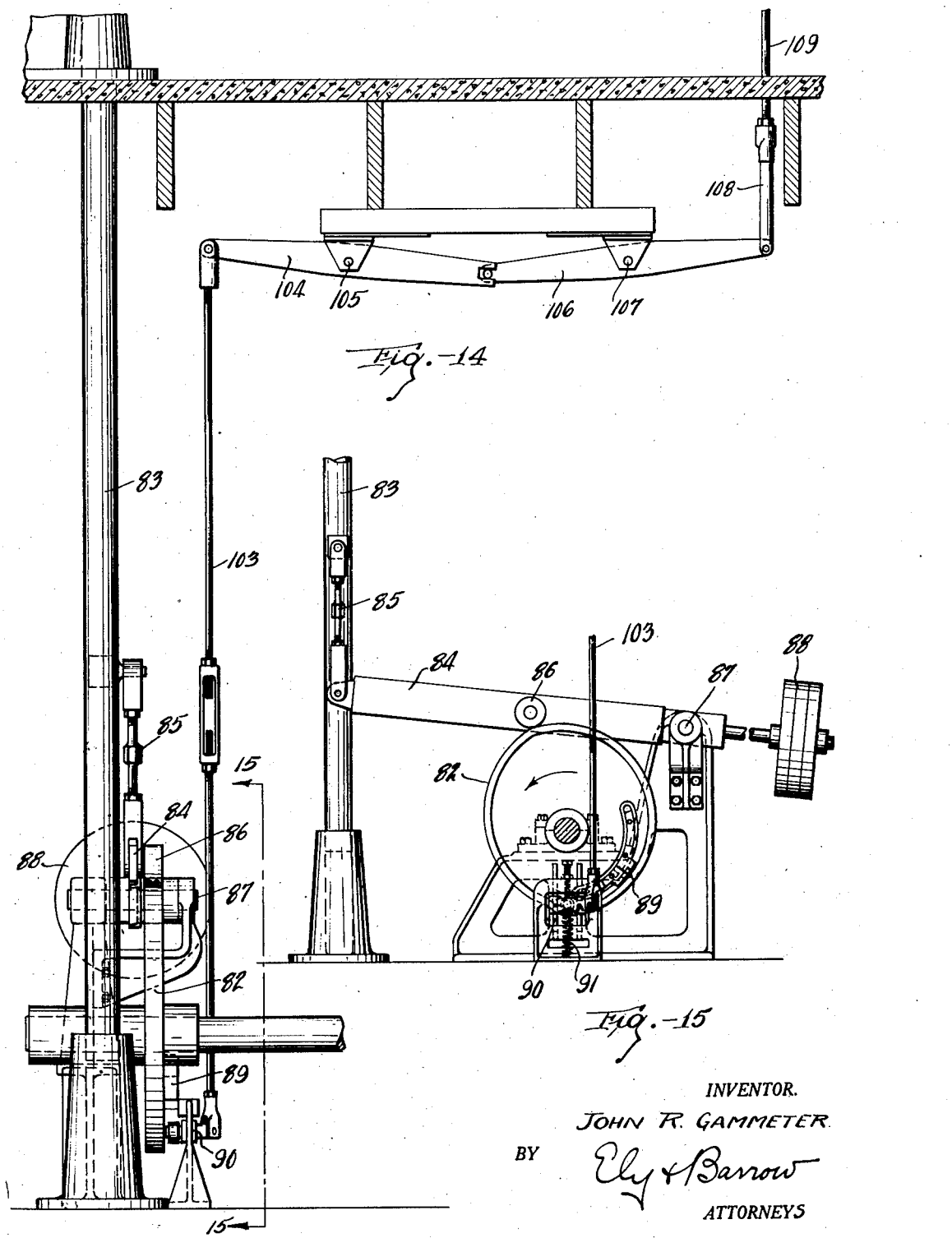
Figure 14 is an enlarged part section on line 14—14 of Figure 13.
Figure 15 is a section on line 15—15 of Figure 14.

The rods 127 are adapted to support the plate 125 adjacent the tops of the baffle members 128 when the tanks are in their lowermost position, the bottoms of rods 127 engaging the floor beneath the tanks for this purpose (note dotted line portion Figure 7). The plate 125 is provided with flap valves 129, 129 adapted to close to pressure on top thereof and to open to pressure beneath the same whereby as the tanks are elevated the plate 125 will move downwardly relative to the tanks permitting latex to flow through the flap valves but when the tank is lowered the plate is raised relative thereto causing the latex to be pushed upwardly (relatively speaking) over the top of the baffle and to flow down about and under the baffles to the underside of the plates.

Stations D and E constitute drying stations and at these the arms 52 are adapted to register with a port 57a in member 57 to circulate hot air through the insides of the forms as will be understood.

Stations F and G constitute form cooling stations and accordingly means for directing cold air against the forms are provided here. These means comprise casings 112, 112 arranged under the racks to which cold air may be supplied by a duct 113 through which cold air may be delivered by a fan (not shown) from the washer 62. At these stations and at station H the dipping on the forms continue to dry from the outside.

Station J is a drying station subsequent to the second dipping station and at this station an aperture 57b in member 57 is arranged to register with the arm 52 at that station to supply hot air to the interiors of the forms.

The rack conveyor and associated apparatus

The rack conveyor 32 includes a stretch 32ª extending past the station A of the dipping and drying turret in which stretch bead rollers 33 may be arranged, an upwardly inclined and then curving stretch 32ᵇ with which the final drier 34 may be associated, an elevated stretch 32ᶜ with which a vulcanizer tank 35 is associated and on which stretch the conveyor is adapted to carry the forms down into the tank at one end and to carry the forms out of the tank at the other end and finally a curved and then downwardly sloping stretch 32ᵈ extending to the straight stretch 32ª.

The conveyor 32 may comprise an overhead track 150 on which rack carriers 151 having wheels 152 thereon may roll to suspend the carriers from the track, said carriers being arranged provided with suitable brackets 153ª and 153ᵇ on the bottom thereof for engaging adjacent ends of the racks 30 to support a series of the racks on the carriers in inverted relation as shown, the bracket 153ᵇ being hinged to bracket 153ª as at 153ᶜ. The carriers 151 are connected by rods 154, 154 fixed to brackets 153ª of each carrier and secured to bracket 153ᵇ on the next carrier thereto.

For moving the connected carriers constituting the rack conveyor along the path defined by track 50, drive chains 155, 155 provided with rollers 156 engaged on tracks 157, 157 are adapted to engage with a portion of the conveyor such as the portion along the straight stretch 32ª, these chains having lugs 155ª, 155ª thereon for engaging lugs such as may be provided by projecting ends of the hinge pins 153ᶜ. Chains 155 are trained over suitable idler sprockets 158 and 159 and over drive sprocket 160, the latter being driven by a sprocket 161 over which is trained a drive chain 162. Chain 162 is driven by a sprocket 163 in turn driven through reduction gearing 164 by a sprocket 165, the latter being driven through a chain 166 by a drive sprocket 167 on main shaft 72. The conveyor 32 is accordingly driven in timed relation with respect to the turret to keep the entire plant in continuous operation, the clean form racks being continuously delivered by the conveyor for mounting on the turret at position A and for receiving the dipped form racks at said position and transporting them through the various devices associated with the conveyor 32.

The bead roller

The bead roller (see Figures 20, 21, 22 and 22ª) comprises a pair of inclined rotary brushes 170, 170 arranged at the sides of conveyor 32, these brushes being journaled in brackets 171, 171 pivoted on pins 172, 172 and retained therein by nuts 173. Bolts 175 are secured in brackets 171, 171 extending through an arcuate slot 176, in brackets 174 to provide means for securing the brackets 171 at adjusted inclinations on brackets 174. Brackets 174 have posts 177 extending downwardly therefrom by which they are mounted for vertical adjustment in brackets 178 and brackets 178 are in turn horizontally adjustable transversely of the conveyor on rods 179, 179, bolts 180, 180 being adapted to secure said brackets in adjusted positions. The brushes 170 are accordingly adjustable as to inclination, as to height and as to the degree of pressure against or contact with the forms to roll the rings on the rubber goods on the forms as required.

The brushes are arranged to be rotated so that each brush downwardly of the inverted forms (Figure 22) by gears 181 thereon meshed with gears 182 in turn meshed with pinions 183 on the shafts of motors 184 all mounted on brackets 171.

The forms 31 are arranged to be rotated on the racks 30 as has been described and means to rotate the forms on the racks when in contact with the bead rolling brushes are provided at each side of the conveyor 32. This means may comprise chains 185 arranged at the sides of the conveyor to be engaged by sprockets 45 on the bottoms of the inverted racks. These chains may be fixed, in which event the rate of rotation of the forms on the racks is limited by the speed of travel of the racks on the conveyor or these chains may be driven to provide an increased rate of form rotation. To provide for driving the chains they may be made endless and trained over idle sprockets 187 and drive sprockets 188 with rolls 189 holding the stretches of the chain straight which are to be engaged by the sprockets 45 on the form racks. Sprockets 188 may be driven by gears 190 meshed with gear 190ª driven in turn by sprockets 191, drive chains 192 for sprockets 191 being driven by sprockets 193 on a shaft 194. Shaft 194 may be driven by a sprocket 195 over which is trained a chain 196 driven by a sprocket 197 on shaft 72. Suitable guide members 198 may be provided at the entering end of the bead roller to guide sprockets 45 into proper registry with chains 185.

The final drier

The final drier 34 constitutes a casing about conveyor 32 between the bead roller 33 and the vulcanizer 35 which may be heated by steam pipes 34ª and which may have its ends connected by a duct 34ᵇ in which is a suitable heater 34ᶜ for circulating warm air through the drier.

The vulcanizer

The vulcanizer 35 comprises a long tank containing a heated curing medium such as hot water through which the forms 30 are continuously conveyed to cure the rubber goods thereon. To aid in stripping the forms, glycerine or the like may be employed in the water in the vulcanizer tank, the heated glycerine acting as a separating material permitting subsequent stripping by slipping the goods from the forms and avoiding rolling of the goods on themselves for this purpose which heretofore has necessitated an operation called "snapping out" by which the goods were unrolled for packing. From the vulcanizer the goods pass to a station as at S where the vulcanized goods may be stripped from the forms either by suitable mechanism or by hand. The goods are then subjected to the action of suitable pulverant materials such as talc or the like in a tumbling barrel.

Form cleaning

At station T at the conveyor the forms may be wiped in any suitable way to clean any foreign matter adhering thereto prior to their repassage through the dipping and drying apparatus.

The operation

In operation, enough racks 30 are provided to fill the turret 50 and the conveyor 32. The turret 50 is intermittently driven and the conveyor 32 is continuously driven at such related rates that the number of rack receiving supports on the conveyor 32 passing station A will correspond to the number of racks to be removed from the turret and placed on the conveyor and removed from the conveyor and placed on the turret to keep both the turret and conveyor full of racks at all times. The racks of forms containing dipped unvulcanized goods are moved from the turret and placed on the conveyor 32 and the racks of clean forms are removed from the conveyor 32 and placed on the turret to take the places of the racks removed from the turret by an operator at station A.

The cleaned form racks pass from station A on the turret to station B where mounting of the racks thereon may be completed and on the next intermittent actuation of the turret pass to station C, a dipping station.

At station C the dipping tank 75 located there is elevated and then lowered as provided for by the actuating cam 82, therefore the rate of lowering being such that the latex will be laid evenly over the form, it "setting" on the form without flowing as the deposited film is exposed to the atmosphere. This may be facilitated by supplying a small amount of hot air to the forms 40 at this station through a small aperture in member 57 registering with the turret arm 52 at station C. The semispherical ends of the forms requiring lowering the tank 75 at a gradually decreasing rate as these ends are withdrawn from the latex and finally holding the tanks at a point at which the tips of the forms are connected to the latex in the tank by a teat at which point there is a dwell in the lowering of the tank, the functions being performed by the properly designed portions of cam 82. This dwell together with the slight heating of the forms if utilized also serves to practically eliminate the presence of a teat on the goods, for after the dwell the tank is suddenly lowered away from the forms and the teats snap back into the liquid in the tank. Each time the tank is raised or lowered, the entire surface of latex therein is changed by the shiftable plate as has been explained.

From station C, the forms are passed to stations D and E in succession at both of which the forms are heated from within by hot air circulated therethrough as will be understood, this air being at a temperature sufficient to drive the moisture outwardly from the deposited rubber.

From station E the forms next pass in succession to stations F and G at which the hot air is cut off and blasts of cold air are directed about the forms to cool them and also to continue the drying thereof in preparation for the next dipping operation.

From station G the forms pass to a station H at which the drying under ordinary atmospheric conditions proceeds.

The forms next pass to the second dipping station I at which the same operations are performed as at station C.

Then the forms pass to station J where they are subjected to the heat of hot air passed therethrough as at stations D and E. The drying of the forms after the second dip is not prolonged on the turret as after the first dip so that the goods will be in proper condition for effective ring rolling. From station J the forms are accordingly passed to station A where the racks 30 are removed and placed on conveyor 32.

Conveyor 32 passes the forms through the bead roller 33 in which the forms are rotated on the racks while passing in contact with the brushes 170 which progressively roll the rubber film upon themselves downwardly from the bottoms of the inverted forms, the height and inclination of the brushes being set to roll the articles to predetermined finished lengths. The indirect drive employed for the forms through the chains 185, sprockets 45, and trains of gears 44, provides for positive drive of the forms to insure perfect rolling and eliminates rapid wear and heavy replacements in rack equipment such as results from the pressure required for direct frictional drive on the forms as has been heretofore employed to some extent in the art of making dipped goods.

From the bead roller the forms are passed by conveyor through the final drier 34 in which the forms are dried by heat from the outside.

Conveyor 32 then passes the forms through the vulcanizing tank 35 where the goods is subjected to the heat of water at a curing temperature, the length of the tank being such that the forms pass therethrough over the period of time required for vulcanization of the goods. From the vulcanizer the goods pass through stripping station S where the completed goods are stripped from the forms.

Conveyor 32 next passes the forms to station T where they may be wiped off with a damp rag or cleaned any other suitable way before reuse.

Conveyor 32 finally delivers the cleaned forms back to the station A for placing on the turret 50 to replace dipped forms thereon.

It is understood that the invention is especially adapted for dipped goods such as cots but is also adapted for making dipped goods of other shapes, the shape of cams 82 being changed to properly dip forms of such shape. It is also to be understood that the invention is not limited in all its aspects to the manufacture of goods from latex or other water dispersions of rubber, various features of the invention being adapted for effective use in making goods from solutions or cements or rubber and naphtha or the like.

Modifications of the invention may be resorted to without departing from the spirit thereof or the scope of the appended claims.

What is claimed is:

1. That method of making dipped goods from latex or water dispersions of rubber which comprises dipping forms in latex, removing the forms from the latex at a rate such that the latex will set on the forms without appreciable flowing of latex on exposed areas on the forms, varying the rate of removal to compensate for changing of the shape of the issuing portion of the form, stopping the removal of the forms for a short period when the forms are connected to the latex by teats of latex, finally removing the forms from the latex, slightly heating the forms during the dipping operation just described, heating the forms from within to dry the deposited rubber on the forms, and repeating the dipping of the forms and the drying thereof as described with an intermediate cooling step between the first drying and the second dipping.

2. That method of making dipped goods from latex or water dispersions of rubber which comprises dipping forms in latex, removing the forms from the latex at a rate such that the latex will set on the forms without appreciable flowing of latex on exposed areas on the forms, varying the rate of removal to compensate for changing of the shape of the issuing portion of the form, stopping the removal of the forms for a short period when the forms are connected to the latex by teats of latex, finally removing the forms from the latex, heating the forms from within to dry the deposited rubber on the forms, and repeating the dipping of the forms and the drying thereof as described with an intermediate cooling step between the first drying and the second dipping.

3. That method of making dipped goods from latex or water dispersions of rubber which comprises dipping forms in latex, removing the forms from the latex at a rate such that the latex will set on the forms without appreciable flowing of latex on exposed areas on the forms, varying the rate of removal to compensate for changing of the shape of the issuing portion of the form, stopping the removal of the forms for a short period when the forms are connected to the latex by teats of latex, finally removing the forms from the latex, and slightly heating the forms during the dipping operation just described.

4. That method of making dipped goods from latex or water dispersions of rubber which comprises dipping forms in latex, removing the forms from the latex at a rate such that the latex will set on the forms without appreciable flowing of latex on exposed areas on the forms, varying the rate of removal to compensate for changing of the shape of the issuing portion of the form, stopping the removal of the forms for a short period when the forms are connected to the latex by teats of latex, and finally removing the forms from the latex.

5. That method of making dipped goods from latex or water dispersions of rubber which comprises dipping forms in latex, removing the forms from the latex at a rate such that the latex will set on the forms without appreciable flowing of latex on exposed areas on the forms, varying the rate of removal to compensate for changing of the shape of the issuing portion of the form, stopping the removal of the forms for a short period when the forms are connected to the latex by teats of latex, finally removing the forms from the latex, heating the forms from within to dry the deposited rubber on the forms, and repeating the dipping of the forms and the drying thereof as described with an intermediate cooling step between the first drying and the second dipping.

6. That method of making dipped goods from latex or water dispersions of rubber which comprises dipping forms in latex, removing the forms from the latex at a rate such that the latex will set on the forms without appreciable flowing of latex on exposed areas on the forms, varying the rate of removal to compensate for changing the shape of the issuing portion of the form, stopping the removal of the forms for a short period when the forms are connected to the latex by teats of latex, finally removing the forms from the latex, and heating the forms from within to dry the deposited rubber on the forms.

7. That method of making dipped goods from latex or water dispersions of rubber which comprises dipping forms in latex, removing the forms from the latex at a rate such that the latex will set on the forms without appreciable flowing of latex on exposed areas on the forms, varying the rate of removal to compensate for changing of the shape of the issuing portion of the form, stopping the removal of the forms for a short period when the forms are connected to the latex by teats of latex, finally removing the forms from the latex, slightly heating the forms during the dipping operation just described, and heating the forms from within to dry the deposited rubber on the forms.

8. Apparatus of the class described comprising hollow racks of hollow dipping forms, an intermittently operable conveyor adapted to receive said racks thereon and to move the racks through a series of stations including a first dipping station, a drying station, a cooling station, a second dipping station, a second drying station and a station at which the racks can be removed from or placed on the intermittent conveyor, dipping tanks movable relatively to the forms at the dipping stations, means for supplying a heated fluid through the hollow racks on said intermittent conveyor to the forms at said drying stations, and means for blowing a cooling fluid about the forms at the cooling station.

9. Apparatus of the class described comprising hollow racks of hollow dipping forms, an intermittently operable conveyor adapted to receive said racks thereon and to move the racks through a series of stations including a first dipping station, a drying station, a second dipping station, a second drying station and a station at which the racks can be removed from or placed on the intermittent conveyor, dipping tanks movable relatively to the forms at the dipping stations, and means for supplying a heated fluid through the hollow racks on said intermittent conveyor to the forms at said drying stations.

10. Apparatus of the class described comprising hollow racks of hollow dipping forms, an intermittently operable conveyor adapted to receive said racks thereon and to move the racks through a series of stations including a first dipping station, a drying station, a second dipping station, a second drying station and a station at which the racks can be removed from or placed on the intermittent conveyor, dipping tanks movable relatively to the forms at the dipping stations, means for moving said tanks adapted to effect relative withdrawal of the forms from the tanks at a rate such that latex in said tanks will form a film on the forms in which there will be no appreciable flow after the surfaces of the forms leave the body of the latex, said means being adapted to vary the rate of withdrawal to maintain this condition notwithstanding changes in the shape of the surfaces of the forms issuing from the latex and said means providing for a dwell in said withdrawal when the forms are connected to the latex in the tank only by teats of latex extending to the tips of the forms, and means for supplying a heated fluid through the hollow racks on said intermittent conveyor to the forms at said drying stations.

11. Apparatus of the class described comprising hollow racks of hollow dipping forms, an intermittently operable conveyor adapted to receive said racks thereon and to move the racks through a series of stations including a first dipping station, a drying station, a second dipping station, a second drying station and a station at which the racks can be removed from or placed on the intermittent conveyor, dipping tanks movable relatively to the forms at the dipping stations, means for moving said tanks adapted to effect relative withdrawal of the forms from the tanks at a rate such that latex in said tanks will form a film on the forms in which there will be no appreciable flow after the surfaces of the forms leave the body of the latex, said means being adapted to vary the rate of withdrawal to maintain this condition notwithstanding changes in the shape of the surfaces of the forms issuing from the latex, and means for supplying a heated fluid through the hollow racks on said intermittent conveyor to the forms at said drying stations.

12. Apparatus of the class described comprising hollow racks of hollow dipping forms, an intermittently operable conveyor adapted to receive said racks thereon and to move the racks through a series of stations including a first dipping station, a drying station, a second dipping station, a second drying station and a station at which the racks can be removed from or placed on the intermittent conveyor, dipping tanks movable relatively to the forms at the dipping stations, means for moving said tanks adapted to effect relative withdrawal of the forms from the tanks at a rate such that latex in said tanks will form a film on the forms in which there will be no appreciable flow after the surfaces of the forms leave the body of the latex, said means providing for a dwell in said withdrawal when the forms are connected to the latex in the tank only by teats of latex extending to the tips of the forms, and means for supplying a heated fluid through the hollow racks on said intermittent conveyor to the forms at said drying stations.

13. Apparatus of the class described comprising hollow racks of hollow dipping forms, an intermittently operable conveyor adapted to receive said racks thereon and to move the racks through a series of stations including one or more dipping stations and one or more drying stations and a station at which the racks can be removed from or placed on the intermittent conveyor, dipping tanks movable relatively to the forms at the dipping stations, means for moving said tanks adapted to effect relative withdrawal of the forms from the tanks at a rate such that latex in said tanks will form a film on the forms in which there will be no appreciable flow after the surfaces of the forms leave the body of the latex, and means for supplying a heated fluid through the hollow racks on said intermittent conveyor to the forms at said drying stations.

14. Apparatus of the class described comprising hollow racks of hollow dipping forms, an intermittently operable conveyor adapted to receive said racks thereon and to move the racks through a series of stations including one or more dipping stations and one or more drying stations and a station at which the racks can be removed from or placed on the intermittent conveyor, dipping tanks movable relatively to the forms at the dipping stations, and means for supplying a heated fluid through the hollow racks on said intermittent conveyor to the forms at said drying stations.

15. The combination in an apparatus for making dipped rubber goods from latex, of dipping forms and a tank adapted to contain latex and suitably shaped cam means for relatively dipping forms in a tank of the latex and for withdrawing the forms therefrom, said cam means having a portion thereof adapted to effect relative withdrawal of the forms from the tank at a rate such that latex in said tank will form a film on the forms in which there will be no appreciable flow after the surfaces of the forms leave the body of the latex, said cam means having a portion thereof being adapted to vary the rate of withdrawal to maintain this condition notwithstanding changes in the shape of the surfaces of the forms issuing from the latex, and said cam means having a portion thereof providing for a dwell in said withdrawal when the forms are connected to the latex in the tank only by the teats of latex extending to the tips of the forms.

16. The combination in an apparatus for making dipped rubber goods from latex, of dipping forms and a tank adapted to contain latex and suitably shaped cam means for relatively dipping forms in a tank of the latex and for withdrawing the forms therefrom, said cam means having a portion thereof adapted to effect relative withdrawal of the forms from the tank at a rate such that latex in said tank will form a film on the forms in which there will be no appreciable flow after the surfaces of the forms leave the body of the latex, said cam means having a portion thereof being adapted to vary the rate of withdrawal to maintain this condition notwithstanding changes in the shape of the surfaces of the forms issuing from the latex.

17. The combination in an apparatus for making dipped rubber goods from latex, of dipping forms and a tank adapted to contain latex and suitably shaped cam means for relatively dipping forms in a tank of the latex and for withdrawing the forms therefrom, said cam means having a portion thereof adapted to effect relative withdrawal of the forms from the tank at a rate such that latex in said tank will form a film on the forms in which there will be no appreciable flow after the surfaces of the forms leave the body of the latex, said cam means having a portion thereof providing for a dwell in said withdrawal when the forms are connected to the latex in said tank only by teats of latex extending to the tips of the forms.

18. The combination in an apparatus for making dipped rubber goods from latex, of a tank adapted to contain latex, dipping forms, means for internally heating said forms, and suitably shaped cam means for relatively dipping the heated forms in the tank of latex and for withdrawing the forms therefrom, said cam means having a portion thereof adapted to effect relative withdrawal of the forms from the tank at a rate such that latex in said tank will form a film on the forms in which there will be no appreciable flow after the surfaces of the forms leave the body of the latex, said cam means having a portion thereof being adapted to vary the rate of withdrawal to maintain this condition notwithstanding changes in the shape of the surfaces of the forms issuing from the latex, and said cam means having a portion thereof providing for a dwell in said withdrawal when the forms are connected to the latex in the tank only by teats of latex extending to the tips of the forms.

19. The combination in an apparatus for making dipped rubber goods from latex, of a tank adapted to contain latex, dipping forms, means for internally heating said forms, and suitably shaped cams means for relatively dipping the heated forms in the tank of latex and for withdrawing the forms therefrom, said cam means having a portion thereof adapted to effect relative withdrawal of the forms from the tank at a rate such that latex in said tank will form a film on the forms in which there will be no appreciable flow after the surfaces of the forms leave the body of the latex, said cam means having a portion thereof providing for a dwell in said withdrawal when the forms are connected to the latex in said tank only by teats of latex extending to the tips of the forms.

20. That method of making dipped goods from latex or water dispersions of rubber which comprises dipping forms in latex, removing the forms from the latex at a rate such that the latex will set on the forms without appreciable flowing of latex on exposed areas on the forms, varying the rate of removal to compensate for changing of the shape of the issuing portion of the forms, slightly heating the forms during the dipping operation just described, heating the forms from within to dry the deposited rubber on the forms, and repeating the dipping of the forms and the drying thereof as described with an intermediate cooling step between the first drying and the second dipping.

21. In an apparatus for making dipped rubber goods from latex, a dipping tank, an auxiliary tank for supplying latex thereto, said auxiliary tank being connected from its bottom portion to the dipping tank whereby air bubbles in latex supplied to the auxiliary tank will rise in said auxiliary tank, and means for lowering and raising the dipping and auxiliary tanks for dipping operations.

22. In an apparatus for making dipped rubber goods from latex, a dipping tank, an auxiliary tank for supplying latex thereto, said auxiliary tank being connected from its bottom portion to the dipping tank whereby air bubbles in latex supplied to the auxiliary tank will rise in said auxiliary tank, and means for lowering and raising the dipping and auxiliary tanks simultaneously for dipping operations.

23. In an apparatus for making dipped rubber goods from latex, a dipping tank adapted to contain latex and means in said tank vertically reciprocable relatively thereto for changing the surface of latex in the tank to prevent skinning-over.

24. In an apparatus for making dipped rubber goods from latex, a dipping tank adapted to contain latex and a plate in said tank vertically reciprocable relatively thereto for changing the surface of latex in the tank to prevent skinning-over.

25. In an apparatus for making dipped rubber goods from latex, a dipping tank adapted to contain latex and means in said tank vertically reciprocable relatively thereto for changing the surface of latex in the tank to prevent skinning-over, and means for lowering and raising the tank and vertically reciprocating said means relatively thereto.

26. In an apparatus for making dipped rubber goods from latex, a dipping tank adapted to contain latex and a plate in said tank vertically reciprocable relatively thereto for changing the surface of latex in the tank to prevent skinning-over, and means for lowering and raising the tank and vertically reciprocating said plate relatively thereto.

JOHN R. GAMMETER.